United States Patent [19]

Ihrman et al.

[11] Patent Number: 4,459,399

[45] Date of Patent: Jul. 10, 1984

[54] POLYURETHANES AND PROCESS THEREFOR

[75] Inventors: Kryn G. Ihrman; Kestutis A. Keblys, both of Baton Rouge, La.; Donald H. Lucast, Bloomfield, Mich.

[73] Assignee: Ethyl Corporation, Richmond, Va.

[21] Appl. No.: 427,138

[22] Filed: Sep. 29, 1982

Related U.S. Application Data

[62] Division of Ser. No. 303,534, Sep. 18, 1981.

[51] Int. Cl.$^3$ ............ C08G 18/10; C08G 18/32; B29D 27/04

[52] U.S. Cl. ............ 528/64; 264/45.3; 264/45.5; 264/46.7; 264/328.6; 264/DIG. 83; 521/163

[58] Field of Search ............ 264/45.5, 328.6, DIG. 83, 264/45.3, 46.7; 528/64; 521/163

[56] References Cited

U.S. PATENT DOCUMENTS

| | | |
|---|---|---|
| 2,683,730 | 7/1954 | Seeger et al. |
| 2,974,168 | 3/1961 | Sharp et al. ............ 564/331 |
| 3,097,191 | 7/1963 | France et al. ............ 564/333 X |
| 3,180,883 | 4/1965 | Case ............ 564/333 X |
| 3,362,979 | 1/1968 | Bentley . |
| 3,428,610 | 2/1969 | Klebert . |
| 4,061,678 | 12/1977 | Knofel et al. ............ 564/331 X |
| 4,083,870 | 4/1978 | Buysch et al. ............ 564/330 |
| 4,218,543 | 8/1980 | Weber et al. ............ 264/45.5 X |
| 4,296,212 | 10/1981 | Ewen et al. ............ 521/163 |
| 4,297,294 | 10/1981 | Mango ............ 564/333 X |

FOREIGN PATENT DOCUMENTS

| | | |
|---|---|---|
| 2339237 | 2/1975 | Fed. Rep. of Germany ...... 564/333 |
| 1408943 | 10/1975 | United Kingdom . |
| 1534258 | 11/1978 | United Kingdom . |

*Primary Examiner*—Philip E. Anderson
*Attorney, Agent, or Firm*—Donald L. Johnson; John F. Sieberth; John F. Hunt

[57] ABSTRACT

A polyamine mixture formed from formaldehyde, an ortho-alkylaniline, and an ortho,ortho-dialkylaniline. The polyamine mixture is prepared by heating one of the anilines with formaldehyde, mixing the other aniline with an acid catalyst, and slowly adding the former to the latter. The mixtures are useful as chain extenders in polyurethane processes including reaction injection molding. The novel mixtures give unexpected mold gel and set times as compared to corresponding unmixed compounds formed from a single aniline or formed by previous typical condensation reactions. Also, the proportion of polyamines made by the novel mixtures may be varied to give excellent physical characteristics.

7 Claims, No Drawings

POLYURETHANES AND PROCESS THEREFOR

This application is a division of application Ser. No. 303,534, filed Sept. 18, 1981, pending.

BACKGROUND OF THE INVENTION

I. Field of the Invention

This invention relates in general to polyurethanes, chain extenders, and processes for making them. The invention relates in particular to polyamine reaction product mixtures from the reaction process of formaldehyde, an ortho monoalkylated aromatic amine and an ortho, ortho-dialkylated aromatic amine. The invention also relates to the mentioned processes as well as processes for reaction injection molding (RIM) and cast elastomer polyurethanes, including the products made therefrom especially automobile parts.

II. Description of the Prior Art

It is known to prepare useful polymers from the polyaddition reaction of isocyanates with polyols and diamines. Such polymers are made as elastomers, fibers, coatings, adhesives, as well as rigid and flexible foams.

Cast elastomers are made by carrying out the polymerization in a mold, usually at elevated temperature. Products from cast elastomer processes include tires, conveyor belts, and many other articles.

Since the development of reaction injection molding (RIM) processes in West Germany and elsewhere, polymer products have been made thereby for various purposes. These products include high density, integral skin, rigid foams as well as automobile fascia (bumpers), grills, and the like. The products are formed in seconds from positively controlled mixing heads or by other static impingement mixing means. A further description of the RIM process may be found in U.S. patent application Ser. No. 220,749, filed Dec. 29, 1980 now U.S. Pat. No. 4,314,962, which is incorporated herein by reference.

Furthermore, a reinforced RIM (RRIM) process has been developed wherein the injection materials have contained therein prior to reaction, reinforcing fibers, metals, or other shapes/materials to strengthen the resultant products. RRIM products offer a variety of uses not previously available with RIM products since the physical or other properties may be changed by the reinforcing members.

Since the reaction time to a gel state is often only about six (6) seconds, it has proven difficult to conduct RIM and RRIM processes in large molds. Often the polyurethane material hardens in a portion of the mold before the entire mold is filled despite the use of very high pressure static impingement mixing heads and other RIM equipment. Alternatively, complete mixing may not occur at fast mixing rates, resulting in poor quality products. The use of slower setting reactants has not proven entirely satisfactory since such reactants may not mix homogeneously or may otherwise result in a product without appropriate flexibility, tensile strength, hardness, or other properties.

In the past, diethyltoluene diamines and similar aromatic amines have been used, in a relatively pure form, as chain extenders in RIM, RRIM, and cast elastomer processes. Such processes are disclosed in U.S. Pat. Nos. 3,428,610 and 4,218,543. Those patents and others disclose such diamines as 2,5-diamino-xylene, 2,4-diaminomesitylene, 3,5,3'5'-tetra-ethyl-4,4-diaminodiphenylmethane, 1-methyl-3,5-diethyl-2,4-diaminobenzene, and 1,3,5-triethyl-2,4-diaminobenzene. Such chain extenders, used in pure form reliably produce products of specified characteristics in a repeatable mold time. Of course, variation of the reactant polyhydroxy or polyisocyanate will also vary the characteristics and gel/hardening times. Notably, however, the mold times are most readily regulated by the use of predetermined chain extenders.

The only notable chain extender diamine which is formed as a mixture is the mixture of 1-methyl-3,5-diethyl-2,4-diaminobenzene and 1-methyl-3,5-diethyl-2,6-diaminobenzene. This mixture is formed by ethylating the co-product 2,4-diaminotoluene and 2,6-diaminotoluene with an alkyl aluminum halide catalyst.

The diaryl diamine chain extenders are usually made by the condensation reaction of formaldehyde and an alkylated aniline. Relatively pure starting materials are used to assure consistent polyurethane-forming chain extenders.

A particular aniline will produce a methylene-bis-diphenylaniline with repeatable gel time and hardening time. For example, 2,6-diethylaniline may be condensed with formaldehyde to form methylene-bis-2,6-diethylaniline. The reaction product is about 99% bis compound and reacts in most RIM formulations with a gel time of about 7 seconds in a simple beaker gel test which is explained hereinafter.

Analogously, ortho-isopropylaniline is condensed with formaldehyde to methylene-bis-ortho-isopropylaniline of relatively good purity and gel time in the beaker gel test of about 7-8 seconds.

Finally, these chain extenders have been used in cast elastomer processes with considerably slower times, but analogously reliable results when used in pure form.

SUMMARY OF THE INVENTION

Applicants have now discovered that reaction mixtures formed by the process of the invention from formaldehyde and a mixture of alkylated aromatic amines gives unexpectedly good mold times for large molds (i.e. gel time and hardening time). In the examples given above, either the ortho-isopropyl or diisopropylaniline type chain extender, when formed by the conventional formaldehyde condensation process, has a median gel time of about 7-8 seconds. Surprisingly, a polyamine reaction mixture, when made by the process of the invention from formaldehyde, 2 parts diisopropylaniline, and 1 part ortho-isopropylaniline, for example, provides a gel time of about 9-13 seconds. This small time change from prior art methods and mixtures—about four seconds—may seem minor but it provides the capability to use an injection mold about twice the size available for a seven second extender while using the same static impingement mixing equipment and producing a molded product having nearly identical physical characteristics to the product formed from the seven second gel time extender.

In another aspect of the invention, the chain extender mixtures are also useable in cast elastomer processes to provide plastics having good physical properties while avoiding any purification steps associated with preparation of chain extenders. Of course, the mixture for cast elastomers must be made from alkyl-substituted aniline and in appropriate proportions thereof to provide satisfactory gel times, tack-free time, hardening time, and the like.

This invention embodies processes for the preparation of polyamine chain extender mixtures; RIM, RRIM, and cast elastomer processes for making polyurethanes from novel chain extender mixtures; and the novel chain extender mixtures per se. The polyurethanes include the polyurethanes per se as well as articles made therefrom. Such articles include automotive parts such as bumpers, fascia, fenders, panels, and the like. The articles may be purely polyurethane or reinforced with fiberglass, fibers, metal, etc. Finally, the invention also includes compositions of the various mixtures of the polyamine mixtures of the invention with other urethane-forming substances used in the formation of the polyurethane polymers of this invention. Such mixtures include, for example, a mixture stream injected into the mold for a RIM or RRIM process.

Thus, this invention comprises a process for the production of a polyamine mixture, said process comprising the steps of:
(a) heating formaldehyde with one of an ortho-alkylaniline and an ortho,ortho-dialkylaniline wherein the alkyl substituents are lower alkyl or cycloalkyl;
(b) mixing the other of an ortho-alkylaniline and said ortho,ortho-dialkylaniline with an acid catalyst; and
(c) adding the mixture from step (a) to the mixture from step (b) while heating.

This invention also comprises a process for preparing a RIM polyurethane molded product, said process comprising:
(a) at a temperature within the range of about 15° C. to about 100° C. subjecting to static impingement mixing
  (i) a catalyst;
  (ii) an organic polyisocyanate;
  (iii) an organic polyol in the molecular weight range of about 400 to about 7000; and
  (iv) a chain extender polyamine product mixture formed by a process comprising the steps of:
    (A) heating formaldehyde with one of an ortho-alkylaniline and an ortho,ortho-dialkylaniline wherein the alkyl substituents are lower alkyl or lower cycloalkyl;
    (B) mixing the other of said ortho, ortho-dialkylaniline and said ortho-alkylaniline with an acid catalyst; and
    (C) while heating, adding the mixture from step (A) to the mixture from step (B) whereby a preproduct is produced;
(b) subsequently injecting a shot of said preproduct at said temperature into a closed preheated mold having a temperature of from about 15° C. to about 100° C.;
(c) opening the mold and removing the formed polyurethane molded product; and
(d) optionally subjecting said molded product to a postcure at a temperature within the range of from about 50° C. to about 150° C.,
said process being conducted such that the amount of said polyamine product mixture is from about 5 to about 30 weight percent of the total weight of components (i)–(iv).

This invention also comprises a process of preparing cast elastomer molded product, said process comprising the steps of:
(a) at a temperature of about 25° C. to about 150° C. forming a prepolymer by reacting an organic polyisocyanate and an organic polyol compound, said polyol having a molecular weight of about 400 to about 7000;
(b) at a temperature of about 30° C. to about 150° C. reacting with said prepolymer thereby produced a chain extender polyamine mixture formed as the reaction product of the process comprising the steps of:
  (i) heating formaldehyde with one of an ortho,ortho-dialkylaniline and an ortho-alkylaniline wherein the alkyl substituents are lower alkyl or cycloalkyl,
  (ii) mixing the other of said ortho-alkylaniline and said ortho,ortho-dialkylaniline with an acid catalyst, and
  (iii) while heating adding the mixture from step (i) to the mixture from step (ii);
said process being conducted such that the amount of chain extender polyamine mixture is from about 5 to about 30 weight percent of the total weight of said polyamine mixture, the organic polyisocyanate, and the organic polyol.

This invention also comprises a process for preparing a reaction injection molding polyurethane molded product, said process comprising:
(a) at a temperature within the range of about 150° C. to about 100° C. subjecting to static impingement mixing two liquid streams, the first stream comprising
  (i) a catalyst;
  (ii) an organic polyol in the molecular weight range of about 400 to about 7000; and
  (iii) a chain extender polyamine product mixture formed by the process comprising the steps of:
    (A) heating formaldehyde with one of an ortho-alkylaniline and an ortho,ortho-dialkylaniline wherein the alkyl substituents are lower alkyl or lower cycloalkyl,
    (B) mixing the other of said ortho,ortho-dialkylaniline and said ortho-alkylaniline with an acid catalyst, and
    (C) while heating, adding the mixture from step (A) to the mixture from step (B),
and the second stream comprising;
  (iv) an organic polyisocyanate or prepolymer formed from an organic polyisocyanate and an organic polyol whereby a liquid mixture is produced,
(b) subsequently injecting a shot of said liquid mixture into a closed preheated mold having a temperature of from about 15° C. to about 100° C.;
(c) opening the mold and removing the formed polyurethane molded product; and
(d) optionally subjecting said molded product to a postcure at a temperature within the range of from about 50° C. to about 150° C.;
said process being conducted such that the amount of chain extender polyamine product mixture is from about 5 to about 30 weight percent of the total weight of components (i)–(iv).

DESCRIPTION OF THE PREFERRED EMBODIMENTS

This invention pertains to improved polyurethane systems, more particularly in one aspect it pertains to polyurethane systems for reaction injection molding (RIM). Reaction injection molding is a rapid, typically one-step process for producing essentially integral skin, elastomeric parts. RIM is a relatively new process rapidly taking its place alongside more established plastic processes. It was developed to compete with injection molding of thermoplastic urethane and rubber for large, thin fascia for the front and rear ends of automobiles. The earliest development was in Europe where it is widely used today in the production of furniture, cabinets, and building components.

The process requires liquid components which can be catalyzed to produce rapid polymerization at low temperatures.

The process comprises separate feeding of polyol and isocyanate under very precise control with high-pressure metering pumps into a mixing head where the liquid streams are mixed under very high velocity and then injected into a closed mold. An alternative method utilizes piston displacement of the liquids at controlled rates to meter the reactants into the mixing head.

Typically, the mixing head is self-cleaning and mounted on the mold. It contains a relatively small, usually cylindrical, mixing chamber of the static impingement type where the liquid streams are mixed. The head usually has a valving mechanism that directs into the mixing chamber where the 'shot' is made. The head usually has a piston to clean the mixing chamber and seal the mold after the shot is completed.

A more recent development is reinforced RIM, which is designated "RRIM." In this technology, RIM plastics are reinforced with a filler such as milled glass, wollastonite or other mineral fillers. These materials reduce the coefficient of thermal expansion and give a product also having a higher flexural modulus. This technology offers promise as a means of providing large exterior body parts such as fenders, which can be matched to steel.

The 4,4'-methylenebis (phenylisocyanate) (MDI)is a preferred diisocyanate for preparing RIM polyurethanes according to this invention. Some commercial preparations of this compound have a minor amount of trinuclear components; however, these commercial materials can be used in this invention. This invention also includes polyurethanes derived from other polyisocyanates such as the following substances and mixtures thereof; m-phenylenediisocyanate; 2,4-toluenediisocyanate; 2,6-toluenediisocyanate; naphthalene-1,5-diisocyanate; 1,3,5-benezenetriiisocyanate; and polyarylpolyalkylenepolyisocyanates such as a polymethylenepolyphenylisocyanate. Isocyanates prepared by the phosgenation of the reaction product between aniline and formaldehyde having a functionality of 2.2 to about 3.5 are described in U.S. Pat. Nos. 2,683,730 and 3,362,979. Additional applicable isocyanates are mentioned on pages 4–5 of British Pat. No. 1,534,258 and that disclosure of useful isocyanates from page 4, line 24, to page 5, line 10, is incorporated by reference herein as if fully set forth.

RIM polyurethanes of this invention are preferably made from polyether diols. More preferably, these polyether diol compounds predominately have two hydroxy groups bonded to primary carbon atoms. Typically, in such more preferred materials up to about 90 percent of hydroxy groups present are primary. Polyether polyols suitable for use in this invention are made by polymerization of cyclic ethers such as ethylene oxide, propylene oxide, butylene oxide, tetrahydrofuran, and the like. These cyclic ethers can be used individually or as mixtures or in successive fashion when making a polyether. For example, when it is desired to prepare a polyether polyol with a predominance of hydroxyl groups bonded to primary carbon atoms, it is known that such materials can be made by initially polymerizing propylene oxide and/or a higher oxide and then reacting the intermediate thereby produced with ethylene oxide.

The organic compounds used as polyhydroxy reactants in this invention are dihydroxy polyalkylene polyethers having at least two primary hydroxyl groups and a molecular weight of from about 400 to about 12,000, more preferably from about 400 to about 7000 or 5000. Typically, such polyethers are made by polymerization of ethylene oxide, propylene oxide, butylene oxide, tetrahydrofuran, or the like. The materials may be polymerized alone, or as mixtures, or in a successive addition.

Polyurethanes produced by the above-described reactants are extended, i.e. chain-lengthened, by the aromatic polyamine mixtures of this invention. The polyamines of the mixture contain amino groups which react with the isocyanate(s) used in the processes of this invention. Furthermore, the polyamines of the inventive mixtures are substantially free of groups which react with the isocyanate(s) to terminate polyurethane chain formation.

The chain extender mixtures of the present invention are either liquid at reaction temperature or are soluble/dispersable in the polyols used in the RIM process.

In another aspect, this invention also pertains to urethane cast elastomers. These elastomers are made by pouring a reaction mixture into a mold where they are allowed to cure. Production can be carried out by the one-shot or by the prepolymer method, the latter being preferred. In this method a polyol of say, 1,000 to 3,000 m.w. and of the polyester or polyether type, is reacted with a stoichiometric excess of diisocyanate to produce a pre-polymer. Chain extension is then carried out with a chain extender of the type provided by this invention and discussed above. Some of the factors which have a bearing on the final properties are molecular structure, chain entanglement, and secondary bonding forces such as hydrogen bonding and van der Waals forces. These are controlled by selection of the molecular components employed, as well known in the art. For example, typically each backbone exhibits its own advantages and disadvantages; e.g. polyether types display better resilience, lower heat buildup, better hydrolytic stability, good low temperature properties, and low processing viscosity. The polyesters, however, are tough, abrasion-resistant elastomers with better oil resistance and can be produced at lower cost. It should be noted that these comparisons are made with urethanes having the same hardness.

The most common technique for producing high-quality castings is by use of an automatic dispensing machine. The machine degasses the prepolymer either in a batch or continuous mode and meters it along with the chain extender in controlled proportions to a mix-head. Here the components are mixed thoroughly, then discharged into a mold. A significant advantage in liquid casting is that less capital expense is required for processing equipment as compared to that needed for the thermoplastic or millable gum elastomers.

Urethane cast elastomers of the type known in the art have a hardness range of approximately 10 Shore A to 80 Shore D. These polymers are tough, abrasion resistant, with good mechanical strength and oxidation resistance. They are used in truck tires, grain chute liners, conveyor belts, gears, seals, and in many industrial parts.

As apparent from the description herein, this invention pertains to an improvement in the field of polyurethane chemistry. As well known, these polyurethanes as well as those made by the RIM process arise from the reaction of a polyol with a polyisocyanate.

For the cast elastomers of this invention, after or during reaction of the polyisocyanate and polyol, the chain length is extended via the aromatic polyamine mixture of the invention. In addition to the polyol, polyisocyanate, and chain extender of this invention, cast elastomer compositions of this invention may also include other materials such as catalysts, blowing agents, and materials commonly employed in making polyurethane cast elastomers, RIM, or RRIM materials.

Of course the polyamine mixture of the invention must be suitable for the timing required in molding by the various techniques discussed above.

Both polyalkylene ether glycol and polyester glycols can be used in forming the prepolymer and finished compositions of this invention.

Generally, the polyether glycols can be prepared by the polymerization of cyclic ethers, such as tetrahydrofuran or epoxides or by the addition of epoxides to glycols, dihydroxyethers, dihydroxythioethers, dihydric phenols and the like by known methods. Polyalkylene ether glycols suitable for the preparation of polyurethane prepolymers should have a molecular weight of at least 500, although it can be as high as 10,000. Molecular weights of about 750 to 3000 are preferred. Optionally, glycols having molecular weights of less than about 350 can be added to the high molecular weight glycols. These low molecular weight glycols can be used in proportions of about 0.5–3.0 moles per mole of polyether glycol, but the exact proportions are determined by the desired physical properties of the final products.

Representative glycols include ethylene glycol, 1,2-propylene glycol, 1,2-butylene glycol, 1,3-butanediol, 1,4-butanediol, 1,5-pentanediol, 1,10-decanediol, 3-cyclohexene-1,1-dimethanol, diethylene glycol, dipropylene glycol, and the like. Mixtures of these, as well as the alcohols described below, can be employed.

For polyester polyols, they can be based on polyester glycols, such as poly(ethylene adipate), poly(ethylene/propylene adipate), poly(ethylene glutarate), and poly(ethylene pimelate). Polyester glycols suitable for the preparation of polyurethanes can be made by several alternate routes, such as: condensation of a dicarboxylic acid with an excess of a diol, transesterification of a dicarboxylic acid ester of a lower alcohol with a diol, or reaction of dicarboxylic acid dichloride with diol, optionally in the presence of a proton acceptor. Aliphatic dicarboxylic acids and alkanediols are preferred because of the desirable physical properties of the final products. However, aromatic dicarboxylic acids, such as terephthalic acid, and dihydric phenols, such as hydroquinone or resorcinol, also can be used in the preparation of polyester glycols suitable for making polyurethane prepolymers. Generally, the above described polyester glycols should have a molecular weight of 400–7000, a molecular weight of 750–3000, being preferred.

Because of their greater reactivity, aromatic diisocyanates are preferred but aliphatic or araliphatic diisocyanates also can be used. Representative isocyanates include toluene-2,4-diisocyanate, toluene-2,6-diisocyanate, benzene-1,3-diisocyanate, naphthalene-1,5-diisocyanate, methylenebis(4-phenylisocyanate), 4,4'-biphenylenediisocyanate, hexamethylenediisocyanate, 1,4-cyclohexanediisocyanate, and methylenebis(4-cyclohexaneisocyanate) and the other isocyanates mentioned above. Mixtures of two or more diisocyanates may be employed. The addition of minor amounts of aliphatic or cycloaliphatic diisocyanates to prepolymers based on aromatic diisocyanates is useful for increasing the hardness of cured products without decreasing the pot life.

In order to carry out the process of preparing a cast elastomer according to this invention, a reaction product comprising free isocyanate groups is made by reacting a diol, of the type described above, or a mixture thereof, with a stoichiometric excess of diisocyanate component. In some instances, a large excess can be added to the reaction zone and subsequently some of the excess removed by a distillation or flash under reduced pressure. Alternatively, the desired excess can be added to the reaction zone. In either mode, the initial process step yields a pre-product which has not yet been extended by the chain extender(s) provided by this invention.

The amount of diisocyanate which is used is generally from about 1.01 to 2 moles per mole of polyol. This prepares a prepolymer which can then be reacted with the polyamine mixture which acts as a "curing agent" in this cast-elastomer embodiment. It may be desirable to admix the curing agent and the prepolymer after the prepolymer has been heated to a temperature to reduce the viscosity of the prepolymer. This temperature is usually above about 70° C. However, the temperature should not be so high as to exceed the point at which the prepolymer or any material admixed therewith undergoes an undesirable amount of thermal decomposition. Generally this can be avoided by keeping the temperature below about 100° C.

As with the RIM process of the invention which is described above, the polymerization which comprises the cast elastomer process can be accelerated, if desired, by use of a catalyst. As catalysts, one may use a tin (II) salt of a carboxylic acid, e.g. dibutyl tin maleate, or a basic nitrogen compound such as tetraethyl ammonium hydroxide, or an alkaline compound such as sodium methoxide or phenolate. When used, the catalyst may comprise about 0.00001–10 weight percent; and preferably from about 0.001 to about 1.0 weight percent of the total reaction mixture. Also, the polyurethane cast elastomer may contain additional components such as:

(a) a flame retardant such as tris-chloroethylphosphate, or
(b) emulsifiers such as the product formed from stearic acid and diethanolamine;
(c) foam stabilizers such as those which have a polydimethyl siloxane group bonded to a copolymer of ethylene oxide and propylene oxide;
(d) reaction decelerators such as HCl;
(e) dyes, fillers, cell regulators, bacteriostatic agent and the like.

The exact structures of all of the reaction products of the process of the invention are not precisely known. It is known that a substantial portion, usually about 50% or more by weight, of the product mixture is made up of the expected methylene-bridged diamines. For example, ortho-isopropylaniline and ortho,ortho-diisopropylaniline react to produce the expected three compounds:

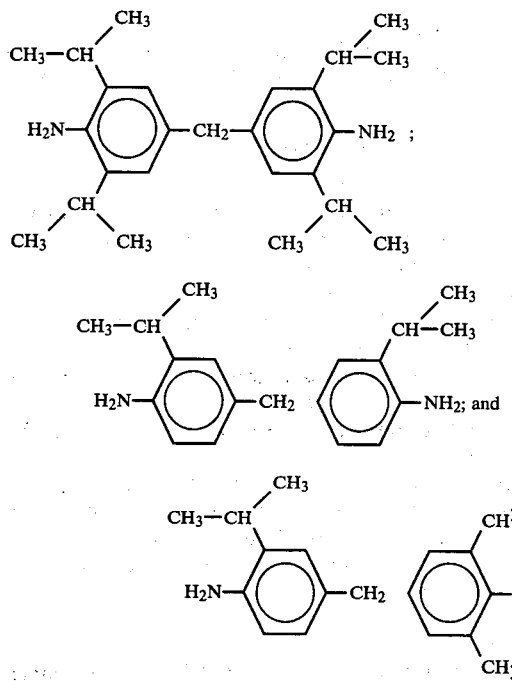

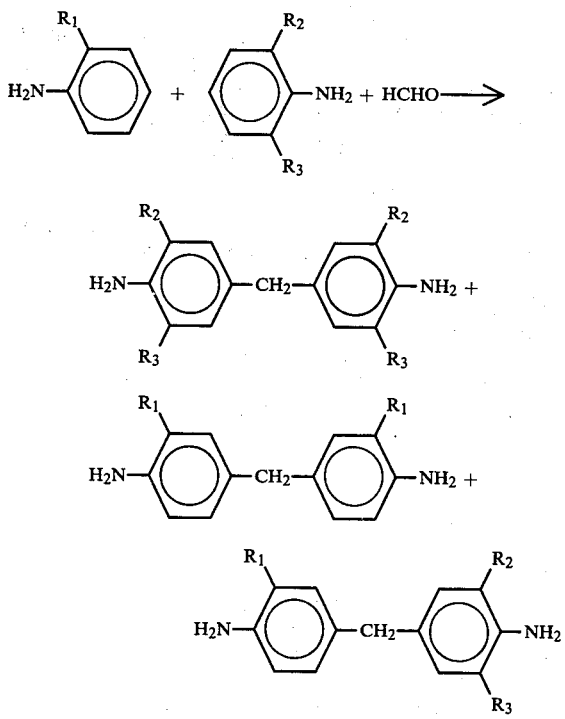

all as reported in U.K. Patent Specification No. 1,408,943. It was suggested therein to form such mixed diamines by the typical condensation reaction for molded foams. The process described therein at Page 11, lines 7-22 results in about 98% conversion to the expected products with 2% trifunctional or higher functional amines. As discussed above such mixtures have proven to have gel times and hardening times inconsistent with large mold RIM and RRIM processes.

While exact identification of a significant amount of the inventive reaction product mixture is unknown and while Applicants do not wish to be bound by any particular theory of composition of reacton mechanism, it is thought that the process of this invention proceeds and produces products as follows.

A first alkylated aniline is heated with formaldehyde to form a significant portion of Schiff base

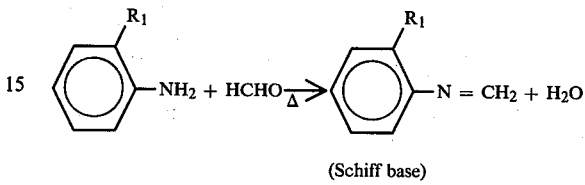

(Schiff base)

This total mixture is added usually slowly to a mixture of acid catalyst and the second aniline to form the expected difunctional amines as well as higher functional amines bridged through the open ortho position:

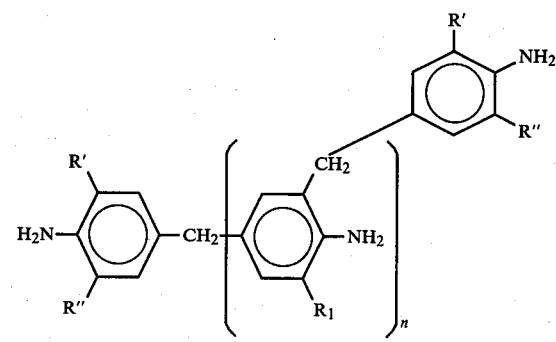

wherein n=0-3 and the R' and R" alkyls correspond to the alkyls of ether or both of the starting alkylanilines.

Applicants do not wish to be bound by the above theory.

Various acids including hydrochloric acid, phosphoric acid, and sulfuric acid may be used in the process of this invention. About 0.001 to 0.1 mole parts acid should be used per mole part of formaldehyde, usually about 0.05 mole parts.

The alkylanilines of the inventive process may be used in a broad spectrum of proportions so long as the products are suitable for RIM, RRIM, and cast elastomer processes and the like. It is possible to use a mixture of alkylanilines in either or both of the first two steps of the inventive process.

The alkyl substituents may be any lower alkyl or cycloalkyl such as methyl, ethyl, isopropyl, sec-butyl, n-octyl, cyclohexyl, cyclopentyl and the like.

Paraformaldehyde in flake, pelletized, or powdered form is a suitable formaldehyde for practicing the invention.

Example I illustrates the prior art method of formaldehyde condensation.

EXAMPLE I

Formaldehyde Condensation

Charge:
(a) 23 grams (0.170 moles) orthoisopropyl aniline
(b) 77 grams (0.43 moles) diisopropylaniline (c) 10.4 grams (0.356 moles) paraformaldehyde
(d) 100 ml. toluene solvent
(e) 3 ml. concentrated $H_2SO_4$ The sulfuric acid was added last and a solid readily formed. The mixture was stirred and heated to reflux where it was maintained for about six (6) hours. Water was removed. The pot temperature at reflux was then about 130° C.

The product diamine mixture was recovered with base, then water, and separated, dried, and filtered. Analysis showed substantially entirely diamine species present with few trifunctional or higher functional amines. This extender had a gel time of about 7-8 seconds and a hard time of about 24 seconds in the beaker gel test (explained below).

The following examples demonstrate the methods of preparing the polyamine chain extender mixtures of this invention.

EXAMPLE II

Equipment: 500 ml flasks, Dean-Stark trap, condenser, thermometer, dropping funnel, $N_2$ source, and heating mantle.

Charge I:
(a) 100 grams (0.671 moles) 2,6-diethylaniline;
(b) 22.1 grams (0.737 moles) formaldehyde;
(c) 50 ml. toluene solvent.

Charge I was heated and stirred in the 500 ml flask at the reflux temperature for about six (6) hours with continuous water separation in a Dean-Stark trap. A dark brown liquid formed.

Charge II:
(a) 40.6 grams (0.330 moles) ortho-ethylaniline;
(b) 75 ml. toluene;
(c) 3 ml. concentrated sulfuric acid.

Charge II ingredients were placed in a clean 500 ml. flask and stirred. The exotherm of reaction heated the reaction mixture in the flask to about 60° C. whereupon a solid began to form. The mixture was heated and maintained at about 120° C. and the brown liquid from Charge I was added dropwise over a 3½ hour period.

The entire reaction mass was then refluxed at 130° C. for about 2½ hours. Thereafter, the toluene/product mixture was cooled to 45° C. and neutralized with a solution of 10 grams sodium carbonate ($Na_2CO_3$) in 100 ml. $H_2O$. To this mixture was added 225 ml. diethyl ether with stirring. The aqueous phase was separated with the organic phase concentrated under reduced pressure of about 1-2 mm Hg at about 140°-160° C. in an oil bath. A dark brown oil resulted.

Analysis of the product revealed about 60% of methylene-bridged diamines.

The product had a gel time of 10 seconds and a hard time of 45 seconds in the beaker gel test. The test is explained in more detail hereinafter.

EXAMPLE III

Charge I:
(a) 2500 grams (14.1 moles) ortho,ortho-diisopropylaniline
(b) 465 grams (15.5 moles) paraformaldehyde;
(c) 1250 ml toluene solvent.

Charge II:
(a) 952.5 grams (7.05 moles) ortho-isopropylaniline
(b) 75 ml. $H_2SO_4$ (concentrated).

The same procedure was followed as in Example II except: larger equipment including a 12-liter flask was used; NaOH was used for neutralization; and the charges were refluxed for two and four hours, respectively.

The product had a gel time of 9-11 seconds and a hard time of about 15-19 seconds in a standard beaker polyurethane test.

EXAMPLE IV

Charge I:
(a) 70.9 grams (0.4 moles) 2-ethyl-6-sec-butylaniline;
(b) 13.3 grams (0.44 moles) paraformaldehyde;
(c) 35 ml. toluene solvent.

Charge II:
(a) 24.2 grams (0.2 moles) ortho-ethylaniline;
(b) 2 ml. phosphoric acid (concentrated).

The same procedure is followed as in Example II except:

Charge I is refluxed to remove water (about 2½ hours);

Charge II is added all at once to Charge I along with an additional 15 ml. toluene for fluidity/mixability and the mixture is refluxed for about 10 hours.

Gel time is 11 seconds; hard time is 22 seconds.

EXAMPLE V

Charge I:
(a) 55.5 grams (0.20 moles) 2-ethyl-6-sec-butylaniline;
(b) 6.65 grams (0.22 moles) formaldehyde;
(c) 15 ml. toluene solvent.

Charge II:
(a) 12.1 grams (0.10 moles) ortho-ethylaniline;
(b) 2 ml. $H_2SO_4$;
(c) 25 ml. isopropanol solvent.

The same procedure was followed as in Example II except that Charge I was refluxed about 4½ hours and the mixture was refluxed about two hours.

Gel time was 11 seconds; hard time was 55 seconds.

EXAMPLE VI

Charge I:
(a) 17.7 grams (0.1 moles) 2-ethyl-6-sec-butylaniline;
(b) 4.5 grams (0.15 moles) formaldehyde;
(c) 3 ml. HCl.

Charge II:
(a) 12.1 grams (0.1 mole) ortho-ethylaniline
(b) 25 ml. isopropanol.

The same procedure is followed as in Example II except the Charge I reflux time is 2½ hours and the mixture reflux time is 10 hours.

Gel time is 8-9 seconds.
Hard time is 50 seconds.

EXAMPLE VII

Charge I:
(a) 35.5 grams (0.2 moles) 2-ethyl-6-sec-butylaniline;
(b) 6.65 grams (0.22 mole) formaldehyde;
(c) 15 m. toluene.

Charge II:
(a) 12.1 grams (0.1 mole) ortho-ethylaniline;
(b) 2 ml. $H_2SO_4$
(c) 50 ml isopropanol Charge I was refluxed for about two hours over a Dean-Stark trap and the solution was cooled. Charge II was homogeneous and was added all at once. After one hour of reflux, an additional 2.5 grams (0.083 mole) formaldehyde was added and reflux continued for about 16 hours. The same recovery procedure as Example II produced a honey-like syrup which beaker tested a gel time of 9 seconds; hard time is 113 seconds.

EXAMPLE VIII

Charge I:
(a) 355 grams (2.0 mole) 2-ethyl-6-sec-butylaniline;
(b) 66.5 grams (2.2 moles) formaldehyde;
(c) 150 ml. toluene.
Charge II:
(a) 121 grams (1.0 moles) ortho-ethylaniline;
(b) 300 ml. isopropanol solvent.
(c) 10 ml. concentrated $H_2SO_4$.

The same procedure is followed as in Example II. Charge I refluxed for 1½ hours.

The mixture refluxed for 21 hours. Gel time is 11 seconds. Hard time is 22 seconds.

EXAMPLE IX

Charge I:
(a) 17.7 grams (0.1 mole) 2-ethyl-6-sec-butylaniline;
(b) 12.1 grams (0.1 mole) ortho-ethylaniline;
(c) 6.6 grams (0.2 mole) paraformaldehyde;
(d) 25 ml. toluene.
Charge II:
(a) 17.7 grams (0.1 mole) 2-ethyl-6-sec-butylaniline;
(b) 12.1 grams (0.1 mole) ortho-ethylaniline;
(c) 2 ml. concentrated $H_2SO_4$;
(d) 50 ml. isopropanol.

The same procedure was followed as in Example II. Charge I was refluxed for about two hours. The combined solutions were refluxed for three hours. An orange oil product (63.0 grams) was recovered.

Gel time was 10 seconds.

Hard time was 20 seconds.

In the polyurethane beaker test the aromatic diamine mixture used as the polyurethane modifier is mixed with the polyol. A solid modifier would be admixed in and placed in an air circulated oven at 150° C. until a substantially homogenous mixture is obtained, then cooled in a nitrogen bag to room temperature.

To this mixture, one drop of the catalyst dibutyl tin laureate is added and mixed. To the resultant blend the MDI is added quickly. A timer is started and hand stirring with a wooden paddle is initiated.

Observations are made as follows:

1. Gelation—time in seconds from start of test until mixture cannot be stirred by hand.

2. Tack-free time—time in seconds from start of test to the point where the surface will not stick to an object.

3. Firm time—time in seconds from start of test to the point where the reaction mass will not yield under manual pressure.

4. Hard time—time required before polymer cannot be chipped off with a wooden spatula.

For comparison, the commercially available mixture of diethylated toluene diamines has a gel time of about 6–7 seconds and a hard time of about 10–20 seconds. That has proven to be too fast for some RIM applications for larger polyurethane products such as automobile body panels and the like.

The following examples demonstrate methods of preparing a cast elastomer and a RIM polyurethane by processes of this invention.

EXAMPLE X

RIM Process

As an example of the RIM process of this invention, a commercial polyol is admixed with the diamine chain extender mixture of the invention and a small portion of dibutyl tin laureate to form a resin in a recirculating system that provides one stream to the mixing head of the RIM equipment.

This resin is recirculated with heating as required to bring the viscosity of the resin to an appropriate level for mixing with polyisocyanate in the mixing head by the static impingement mixing method. A commercial MDI-type isocyanate is used in such proportion that the reactive isocyanate sites thereon are present in about 4% excess of the total of reactive sites on the polyol and the polyamine chain extender mixture. In the subexamples shown below, the recirculation temperature was about 45° C. The mold was preheated to about 60° C. and the product was demolded within about two minutes.

The test formulations using the diamine product of Example III as the chain extender are shown below:

|  | Approximate Parts By Weight |
|---|---|
| (A) Extender | 176 |
| Polyol - Jefferson SF 6503 | 531 |
| Polyisocyanate - Isonate 181 | 292 |
| (B) Extender | 174 |
| SF 6503 | 523 |
| Isonate 181 | 303 |
| (C) Extender | 178 |
| SF 6503 | 537 |
| Isonate 181 | 285 |

(A small catalytic portion of dibutyl tin laureate is also mixed with the diamine/polyol resin).

Each formulation was used to make 5"×8"×⅛" thick plaques by the above RIM procedure. The physical properties of the resulting RIM test plaques are shown in Table I.

TABLE I

| | RIM PROPERTIES | | | |
|---|---|---|---|---|
| | (A) | (B) | (C) | (*) |
| Shore A Hardness | 50 | 51 | 49 | 46 |
| Flexural Modulus × $10^3$ | | | | |
| at −29° C., psi | 160 | 97.5 | 148 | 52 |
| at 24° C., psi | 25 | 27 | 19 | 21 |
| at 70° C., psi | 11.6 | 10.2 | 10 | 11 |
| Modulus Ratio | 13.8 | 9.6 | 14.8 | 4.7 |
| Ultimate Tensile Strength, psi | 2520 | 2890 | 2630 | 1875 |
| Tensile Modulus (100% Elongation) psi | 1330 | 1370 | 1250 | 860 |
| Elongation at Break, % | 275 | 300 | 300 | 470 |
| Die "C" Tear, pli | 347 | 354 | 317 | 328 |
| Heat Sag, 1 hr. at 121° C., inches | .16 | .16 | .27 | .32 |

*For comparison, a plaque was made using 112 parts diethylated toluene diamine, 570 parts SF 6503, and 317 parts Isonate 181.

As can be seen from Table I, the polyamine chain extender mixtures of the invention provide excellent polyurethanes and are usable in large mold RIM/RRIM processes as mentioned above.

EXAMPLE XI

Cast Elastomer

A polyamine prepared from a mixture of 2,6-diisopropyl- and o-isopropyl-anilines essentially as described in Example II was tested as a curative for polyurethane cast elastomers. The polyamine (20.4 g) was heated to about 35° C. and added to 79.6 g of TDI-terminated polyether-based prepolymer (Uniroyal's product B-601 containing 6.2% free NCO groups) preheated to about 40° C. The mixture was mixed vigorously for about 20 seconds, degassed, poured into a mold, and allowed to cure one hour at 110° C. After demolding, the resulting plaque was postcured for 12 hours at 110° C. Physical properties of the cured cast elastomer sample are shown in Table II.

EXAMPLE XII

Typical cast elastomer test plaques were prepared following the procedure of Example XI using polyamine product of Example V as curative (20.6 g) and 79.4 g of B-601 prepolymer. No catalyst was used. The elastomer pot life was 80 seconds. Physical properties of the cured cast elastomer sample are shown in Table II:

TABLE II

| ELASTOMER PROPERTIES | | |
|---|---|---|
| | Ex. XI | Ex. XII |
| Shore A Hardness | 76 | 86 |
| Tensile, psi | | |
| 100% elongation | 1000 | 1500 |
| 300% elongation | 2800 | 4300 |
| at break | 3400 | 4500 |
| Elongation at Break, % | 325 | 350 |
| Die "C" tear, pli | 350 | 400 |
| Split tear, pli | 240 | 245 |

As can be seen from Table II, polyurethanes made by cast elastomer method with the chain extenders of the present invention have good physical characteristics.

We claim:

1. A polyurethane formed from an organic polyol, an organic polyisocyanate, and a chain extender mixture of methylene-bridged diamines and methylene-bridged higher functional amines formed by a process comprising the steps of:
   (a) in a solvent, heating with about two mole parts formaldehyde about one to two mole parts of one of an ortho-substituted aniline and an ortho, ortho-disubstituted aniline wherein the ortho substituents of either said aniline are lower alkyl or cycloalkyl, at about reflux temperature so as to continuously remove water;
   (b) mixing about one to two mole parts of the other of said ortho-substituted aniline and said ortho,ortho-disubstituted aniline with an acid catalyst, the total of said ortho-substituted aniline and said ortho,ortho-disubstituted aniline being up to about three mole parts;
   (c) adding the mixture from step (a) to the mixture from step (b) while heating at about reflux temperature so as to favor formation of higher functional amines; and
   (d) recovering a polyamine mixture comprising higher functional amines being methylene-bridged through the open ortho position and up to about 60% by weight methylene-bridged diamines, providing slower polyurethane gel and hard times than the product from a formaldehyde condensation of the same reactants.

2. An automobile body panel formed of the polyurethane of claim 1.

3. An automobile bumper formed of the polyurethane of claim 1.

4. An article of manufacture formed from the polyurethane of claim 1 by a reinforced reaction injection molding process.

5. A process for preparing a RIM polyurethane molded product, said process comprising:
   (a) at a temperature within the range of about 15° C. to about 100° C. subjecting to static impingement mixing
      (i) a catalyst;
      (ii) an organic polyisocyanate;
      (iii) an organic polyol in the molecular weight range of about 400 to about 7000; and
      (iv) a chain extender product mixture of methylene-bridged diamines and methylene-bridged higher functional amines formed by a process comprising the steps of:
         (A) in a solvent, heating about two mole parts formaldehyde with about one to two mole parts of one of an ortho-substituted aniline and an ortho,ortho-disubstituted aniline wherein the ortho substituents of either said aniline are lower alkyl or cycloalkyl, at about reflux temperature so as to continuously remove water,
         (B) mixing about one to two mole parts of the other of said anilines with an acid catalyst, the total of said anilines being up to about three mole parts,
         (C) while heating at about reflux temperature, adding the mixture from step (A) to the mixture from step (B) so as to favor formation of higher functional amines, and
         (D) recovering a polyamine mixture preproduct comprising higher functional amines being methylene-bridged through the open ortho position and up to about 60% by weight methylene-bridged diamines, providing slower polyurethane gel and hard times than the product from a formaldehyde condensation of the same reactants;
   (b) subsequently injecting a shot of said preproduct at said temperature into a closed preheated mold having a temperature of from about 15° C. to about 100° C.;
   (c) opening the mold and removing the formed polyurethane molded product; and
   (d) optionally subjecting said molded product to a postcure at a temperature within the range of from about 50° C. to about 150° C.,
said process being conducted such that the amount of said polyamine product mixture is from about 5 to about 30 weight percent of the total weight of components (i)–(iv).

6. A process of preparing cast elastomer molded product, said process comprising the steps of:
   (1) at a temperature of about 25° C. to about 150° C. forming a prepolymer by reacting an organic polyisocyanate and an organic polyol compound, said polyol having a molecular weight of about 400 to about 7000;
   (2) at a temperatuae of about 30° C. to about 150° C. reacting said prepolymer thereby produced with a chain extender mixture of methylene-bridged diamines and methylene-bridged higher functional amines formed as the reaction product of the process comprising the steps of:
      (a) in a solvent, heating about two mole parts formaldehyde with about one to two mole parts of one of an ortho,ortho-disubstituted aniline and an ortho-substituted aniline wherein the ortho substituents of either said aniline are lower alkyl or cyloalkyl, at about reflux temperature so as to continuously remove water;

(b) mixing about one to two mole parts of the other of said anilines with an acid catalyst, the total of said anilines being up to about three mole parts, (c) while heating at about reflux temperature, adding the mixture from step (a) to the mixture from step (b) so as to favor formation of higher functional amines, and (d) recovering a polyamine mixture comprising higher functional amines being methylene-bridged through the open ortho position and up to about 60% by weight methylene-bridged diamines, providing slower polyurethane gel and hard times than the product from a formaldehyde condensation of the same reactants;

said process being conducted such that the amounts of chain extender polyamine mixture is from about 5 to about 30 weight percent of the total weight of said polyamine mixture, the organic polyisocyanate, and the organic polyol.

7. A process for preparing a reaction injection molding polyurethane molded product, said process comprising:

(a) at a temperature within the range of about 15° C. to about 100° C. subjecting to static impingement mixing two liquid streams, the first stream comprising (i) a catalyst;

(ii) an organic polyol in the molecular weight range of about 400 to about 7000; and (iii) a chain extender mixture of methylene-bridged diamines and methylene-bridged higher functional amines formed by the process comprising the steps of:

(A) in a solvent, heating about two mole parts formaldehyde with about one to two mole parts of one of an ortho-substituted aniline and an ortho,ortho-disubstituted aniline wherein the ortho substituents of either said aniline are lower alkyl or cycloalkyl, at about reflux temperature so as to continuously remove water, (B) mixing about one to two mole parts of the other of said anilines with an acid catalyst, the total of said anilines being up to about three mole parts, (C) while heating at about reflux temperature, adding the mixture from step (A) to the mixture from step (B) so as to favor formation of higher functional amines, and (D) recovering a polyamine mixture chain extender comprising higher functional amines being methylene-bridged through the open ortho position and up to about 60% by weight methylene-bridged diamines, providing slower polyurethane gel and hard times than the product from a formaldehyde condensation of the same reactants, and the second stream comprising;

(iv) an organic polyisocyanate or prepolymer formed from an organic polyisocyanate and an organic polyol whereby a liquid mixture is produced, (b) subsequently injecting a shot of said liquid mixture into a closed preheated mold having a temperature of from about 15° C. to about 100° C.;

(c) opening the mold and removing the formed polyurethane molded product; and (d) optionally subjecting said molded product to a postcure at a temperature within the range of from about 50° C. to about 150° C.;

said process being conducted such that the amount of chain extender mixture is from about 5 to about 30 weight percent of the total weight of components (i)–(iv).

* * * * *

UNITED STATES PATENT AND TRADEMARK OFFICE
CERTIFICATE OF CORRECTION

PATENT NO. : 4,459,399
DATED : JULY 10, 1984
INVENTOR(S) : KRYN G. IHRMAN ET AL.

It is certified that error appears in the above-identified patent and that said Letters Patent is hereby corrected as shown below:

Column 9, line 16, "-CH$_2$" (in the structure) should read -- -CH$_2$- --.

Column 9, line 24, "-CH$_2$" (in the structure) should read -- -CH$_2$- --.

Column 10, line 6, "of" (second occurrence) should read -- or --.

Column 10, line 6, "reacton" should read -- reaction --.

Column 10, line 30, the diagonal line should be through the bracket in the structure.

Column 10, line 40, "ether" should read -- either --.

Column 10, line 55, "The alkyl substituents" should read -- The substituents --.

Column 12, line 58, "15 m." should read -- 15 ml. --.

Signed and Sealed this

Fifth Day of March 1985

[SEAL]

Attest:

DONALD J. QUIGG

Attesting Officer

Acting Commissioner of Patents and Trademarks